United States Patent
Oksman et al.

(10) Patent No.: US 7,630,489 B2
(45) Date of Patent: Dec. 8, 2009

(54) ADAPTIVE COMMUNICATION SYSTEMS AND METHODS

(75) Inventors: Vladimir Oksman, Morganville, CA (US); Bernd Heise, Munich (DE)

(73) Assignee: Infineon Technologies AG, Munich (DE)

(*) Notice: Subject to any disclaimer, the term of this patent is extended or adjusted under 35 U.S.C. 154(b) by 814 days.

(21) Appl. No.: 10/943,171

(22) Filed: Sep. 16, 2004

(65) Prior Publication Data

US 2006/0056305 A1    Mar. 16, 2006

(51) Int. Cl.
*H04M 1/00* (2006.01)
*H04M 9/00* (2006.01)

(52) U.S. Cl. .............................. 379/392.01; 379/399.02

(58) Field of Classification Search ............ 379/392.01, 379/399.02; 375/240.27; 714/758
See application file for complete search history.

(56) References Cited

U.S. PATENT DOCUMENTS

| | | | |
|---|---|---|---|
| 5,519,731 A | 5/1996 | Cioffi | |
| 5,995,568 A | 11/1999 | Molnar et al. | |
| 6,292,515 B1 * | 9/2001 | Kao et al. | ............ 375/260 |
| 6,324,212 B1 | 11/2001 | Jenness | |
| 6,404,774 B1 | 6/2002 | Jenness | |
| 6,445,773 B1 | 9/2002 | Liang et al. | |
| 6,449,288 B1 | 9/2002 | Chari et al. | |
| 6,539,016 B2 | 3/2003 | Kumar | |
| 6,570,915 B1 | 5/2003 | Sweitzer et al. | |
| 6,628,704 B1 | 9/2003 | Long et al. | |
| 6,754,318 B2 | 6/2004 | Oksman et al. | |
| 2002/0080867 A1 | 6/2002 | Abbas et al. | |
| 2003/0123560 A1 | 7/2003 | Jacobsen et al. | |
| 2003/0130824 A1 | 7/2003 | Antoine et al. | |
| 2003/0198217 A1 | 10/2003 | Redfern | |
| 2003/0223482 A1 | 12/2003 | Oksman et al. | |
| 2003/0223518 A1 | 12/2003 | Shmulyian et al. | |
| 2004/0004936 A1 | 1/2004 | Ginesi et al. | |
| 2004/0008804 A1 | 1/2004 | Honken et al. | |
| 2004/0015765 A1 * | 1/2004 | Cooper et al. | ............... 714/750 |
| 2004/0066738 A1 | 4/2004 | Stopler | |
| 2004/0071240 A1 | 4/2004 | Betts | |
| 2005/0138524 A1 * | 6/2005 | Cioffi | ......................... 714/758 |

OTHER PUBLICATIONS

International Search Report, Int'l Application No. PCT/EP2005/009818. Int'l Filing Date Sep. 13, 2005, 3 pgs.

* cited by examiner

*Primary Examiner*—Alexander Jamal
(74) *Attorney, Agent, or Firm*—Eschweiler & Associates, LLC

(57) ABSTRACT

Methods and communication systems are presented, in which impulse noise is monitored on a communication channel, and impulse noise protection parameters are adjusted according to the monitored impulse noise without interrupting communication service.

9 Claims, 8 Drawing Sheets

ADAPTIVE COMMUNICATION SYSTEMS AND METHODS

FIELD OF INVENTION

The present invention relates generally to communication systems and more particularly to adaptive communication methods using Digital Subscriber Line (DSL).

BACKGROUND OF THE INVENTION

Digital subscriber line (DSL) technology provides high-speed data transfer between two modems across ordinary telephone lines, wherein digital data transfer rates from tens of Kbps to tens of Mbps are supported over standard (e.g., twisted pair) telephone lines, while still providing for plain old telephone service (POTS). Asynchronous Digital Subscriber Line (ADSL) and Very High Digital Subscriber Line (VDSL) have emerged as popular implementations of DSL systems, where ADSL is defined by American National Standard Institute (ANSI) standard T1.413 and International Telecommunication Union (ITU-T) standards G.992.3, G.992.5, and VDSL is defined by ANSI standard T1.424 and ITU-T standard G.993.1. ADSL, VDSL and other similar DSL systems (collectively referred to as "xDSL") typically provide digital data transfer in a frequency range above the POTS band (e.g., about 300 Hz to 4 kHz), for example ADSL G.992.3 operates at frequencies from about 25 kHz to about 1.1 MHz.

Most DSL installations are operated as multicarrier systems using Discrete Multi Tone (DMT) modulation, in which data is transmitted by a plurality of subcarriers (tones), sometimes alternatively referred to as subchannels, sub-bands, carriers, or bins, with each individual subcarrier utilizing a predefined portion of the prescribed frequency range. In ADSL, for example, 256 subcarriers are used to transmit a DMT symbol, with each subcarrier having a bandwidth of 4.3125 kHz. The transmit digital data is encoded and modulated at the transmitter using Quadrature Amplitude Modulation (QAM) and Inverse Discrete Fourier Transform (IDFT) to create the modulated multicarrier signal for transmission along the DSL loop or channel, which is then demodulated at the receiving end and decoded to recover the transmitted data. The bits of data to be transmitted over each subcarrier are encoded as signal points in QAM signal constellations using an encoder or a bit mapping system. Signal constellations are then modulated onto the corresponding subcarrier. The total number of data bits transmitted over the channel is a sum of the bits transmitted by each subcarrier.

As in most types of communication systems, it is desirable to maximize the amount of data successfully transferred across the communication medium between DSL modems, sometimes referred to as the bit rate or data rate. The data rate, in turn, depends on the noise characteristics of a particular communication channel. In the case of DSL systems, a pair of modems is connected by a twisted pair of wires that form the communication medium. In this situation, noise may be generated by signals on neighboring wire pairs (e.g., crosstalk noise) in a distributed telephony system, as well as by outside sources of Radio Frequency Interference (RFI) or other noise. The noise on a particular communication channel may be generally modeled or characterized as continuous noise or impulse noise or both. Continuous noise is sometimes modeled as Additive Gaussian Noise (AGN) with randomly distributed values of noise over time, whereas impulse noise is generally short bursts of relatively high levels of channel noise. Various mechanisms or techniques are employed in DSL and other communication systems to combat continuous and impulse noise and/or to correct noise-related data transfer errors.

Continuous noise is typically addressed by transmitting more data bits over subcarriers with small amounts of continuous noise, and fewer data bits over subcarriers with higher continuous noise. The allocation of data bits to particular subcarriers is sometimes referred to as bit allocation or bit distribution, wherein the bit distribution parameters may be set to accommodate particular continuous noise conditions on the channel. However, simply maximizing continuous noise protection by reducing the number of bits transmitted by specific sub-carriers may lead to non-optimal system data rate, since maximizing continuous noise protection in this way reduces the number of data bits on the subcarriers. Accordingly, DSL systems are initially setup with continuous noise protection (e.g., bit distribution) settings or parameters that are selected according to subcarrier noise assessments based on estimation of the channel noise during system initialization. While such approaches using fixed continuous noise protection settings provide a good continuous noise protection and high data transfer rates, communication channel continuous noise conditions tend to change over time. In this regard, if the continuous noise decreases, the fixed modulation parameters will suffice to protect against data errors, but potential increased data rates are not attained. Conversely, if the continuous noise increases, the previously set protection parameters may no longer be sufficient to provide adequate protection against data transfer errors in the channel.

In order to address this situation, DSL systems provide adaptive tuning of the bit distribution parameter settings to accommodate changing of continuous noise, including bit swapping, rate adaptation, and bandwidth repartitioning techniques, each of which involve changes to a number of modulation parameters. In a typical situation, the signal-to-noise ratio (SNR) for each subcarrier is measured during system initialization, and the maximum bit capacity of each subcarrier is determined. Once the transmission capability of the system is thus assessed, more bits (e.g., larger constellation sizes) are assigned onto subcarriers with higher SNR compared to subcarriers having lower SNR and the subcarrier relative transmit powers (gains) are set. DSL service is then begun and the subcarriers SNR are measured during data transmission; the bit re-distribution (bit swapping) being performed and subcarrier gains being adjusted according to changes in the subcarrier SNR measurements.

Bit swapping by itself does not change the total data rate of the communication channel, but serves to increase or maintain continuous noise immunity by reallocating data bits from noisy subcarriers to more noise-free subcarriers. Where the channel noise increases significantly, bit swapping alone may not be adequate to prevent data transmission errors, and seamless rate adaptation (SRA) may be employed to decrease the number of data bits transmitted over some subcarriers. If the channel continuous noise thereafter decreases (e.g., SNR increases), SRA can then be used to increase the number of data bits. While these techniques can effectively react to changing continuous noise conditions, impulse noise protection is largely unaffected by bit distribution settings and seamless rate adaptation.

Impulse noise in DSL systems usually causes erasure of an entire modulated signal for a relatively short period of time, regardless of the number of bits allocated to the entire channel or to particular subcarriers. Forward error correction (FEC) is a means to combat impulse noise in DSL and other communication systems. An FEC encoder generates a certain amount of redundancy bytes for each block of transmitted data bytes. The redundancy bytes are then added to the data bytes to form an FEC codeword. At the receive side, the FEC decoder uses redundancy bytes for recovering (correcting) a certain amount of corrupted data bytes, and thereby ensures that when a small number of bytes in a codeword are corrupted, the original data transmitted in the codeword can be recovered. In general, the number of error bytes that can be corrected by FEC is half of the number of redundancy bytes included in the codeword. Thus, increasing FEC redundancy adds further FEC protection against impulse noise while effectively decreasing the data rate, and vice versa, wherein the goals of impulse noise protection and data rate involve a tradeoff.

In addition to redundancy, FEC encoders also provide interleaving (IL) to combat impulse noise. An interleaver (at the transmit side) segments the FEC codewords into smaller portions (segments) after the addition of FEC redundancy bytes, with segments from different codewords being mixed in a certain order prior to bit distribution and modulation. The order of segment mixing is so that segments belonging to the same FEC codeword are placed as far as possible from each other. This results in the bytes of the same codeword being spread out over time, whereby impulse noise corruption of the transmitted stream of data during any given short period of time results in corruption of only one or a few segments belonging to a particular codeword, causing fewer errors in each reassembled (e.g., de-interleaved) codeword at the receive side. Thus, FEC redundancy allows correction of a certain amount of corrupted data in each codeword, and interleaving helps to reduce the amount of corrupted bytes in the individual codewords, whereby DSL systems may effectively combat a given amount of impulse noise in the communication channel. However, interleaving requires buffer memory at the transmitter and receiver modems and introduces latency in the transferred data. Also, as discussed above, increasing FEC capabilities requires more redundancy bytes to be introduced, and reduces the data rate. Thus, there is a tradeoff between impulse noise protection and data rate in DSL systems.

The parameters for impulse noise protection mechanisms, such as FEC and IL in DSL systems, have conventionally been set up at system installation. However, the current field experience shows that impulse noise characteristics for any specific installation are almost unpredictable and changing in time. Therefore, it is usually unclear how the impulse noise protection has to be set. In one example, the impulse noise parameters (e.g., the number of FEC redundancy bytes and the level or amount of data interleaving) are maximized, and left unadjusted as DSL service is provided, resulting in reduced DSL data rate. Recent proposals suggest iterative adjustment of FEC/IL parameters during initialization, by repeating the initialization procedure several times with different settings. This is also not comprehensive, since it increases initialization time, which makes the system inconvenient for the user. Moreover, this proposal fails to provide good settings because the time over which the multiple parameter adjustments are done is relatively short considering that impulse noise conditions may change over a period of hours or days. Thus, the multiple initialization time is still very short to observe changes in the impulse noise conditions. As a result, we see that impulse noise conditions may change over time, wherein excessive FEC/IL protection settings unnecessarily sacrifice data rate if the impulse noise is reduced, while limited FEC/IL protection risks unwanted data loss when the impulse noise situation worsens. Accordingly, there is a need for improved impulse noise protection methods and apparatus to combat changing impulse noise in transmission channels of DSL and other communication systems, while allowing maximum data rates.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention involves communication systems and methods for adaptive adjustment of a DSL or other communication systems, in which impulse noise on a communication channel is monitored during the communication service, and impulse noise protection is selectively adjusted according to the impulse noise without interrupting the communication service. The invention facilitates tailoring impulse noise protection such as codeword format changes including the number and location of forward error correction redundancy bytes and codeword size, and/or adjustment of interleaving to accommodate or compensate for changing impulse noise conditions in DSL or other communication systems, so as to protect against data errors without unnecessarily sacrificing data rate.

One aspect of the invention provides a method for adaptive adjustment of a communication system. The method comprises monitoring impulse noise on a communication channel during the communication service, and selectively adjusting impulse noise protection according to the impulse noise without interrupting the communication service. In one implementation, the impulse noise is monitored by monitoring data transfer errors occurring on the communication channel, determining whether any of the data transfer errors are packetized errors, and determining whether any such packetized errors are corrected or uncorrected. The selective adjustment of the impulse noise protection may comprise selectively increasing the impulse noise protection if there are uncorrected packetized errors, and selectively decreasing the impulse noise protection if there are no uncorrected packetized errors and the number of corrected packetized errors is less than a threshold value (including no packetized errors at all, corrected or uncorrected), wherein the impulse noise protection is left unchanged if there are no uncorrected packetized errors during sufficiently long time intervals, and the number of corrected packetized errors is less than or equal to the threshold value.

Another aspect of the invention provides a method for adaptive adjustment of a communication system, comprising monitoring impulse noise as well as continuous noise on the communication channel during communication service, and selectively adjusting impulse noise protection and continuous noise protection in the system according to the impulse noise and the continuous noise without interrupting the communication service. In one example, bit swapping and/or seamless rate adaptation are performed to adjust for changing continuous noise conditions, and FEC/IL and codeword size parameters are selectively adjusted according to impulse noise conditions, wherein the impulse noise protection and the continuous noise protection are adjusted in a coordinated fashion to minimize redundancy.

Yet another aspect of the invention provides a communication system, comprising a communication channel and first and second modems coupled with the communication channel, where the receiving modem is adapted to monitor impulse noise on the communication channel during the communication service. The modems cooperatively adjust impulse noise protection according to the observed impulse noise characteristics without interrupting the communication service. In one implementation, the receiving modem also monitors continuous noise on the communication channel during the communication service, wherein the first and second modems are adapted to cooperatively adjust impulse noise protection and continuous noise protection in the system according to the observed impulse noise and the continuous noise characteristics without interrupting the communication service.

Still another aspect of the invention provides a modem, comprising a transceiver, a monitor system, and an analyzer system. The transceiver is coupleable to a communication channel and supports communication service with a second modem on the communication channel. The monitor system monitors data transfer errors occurring on the communication channel during communication service, and the analyzer system determines whether any of the data transfer errors are packetized errors, and also whether any packetized errors are corrected or uncorrected. The analyzer is further adapted to propose impulse noise protection adjustments to the second modem according to the observed impulse noise characteristics and to cooperatively adjust impulse noise protection according to the impulse noise without interrupting the communication service.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
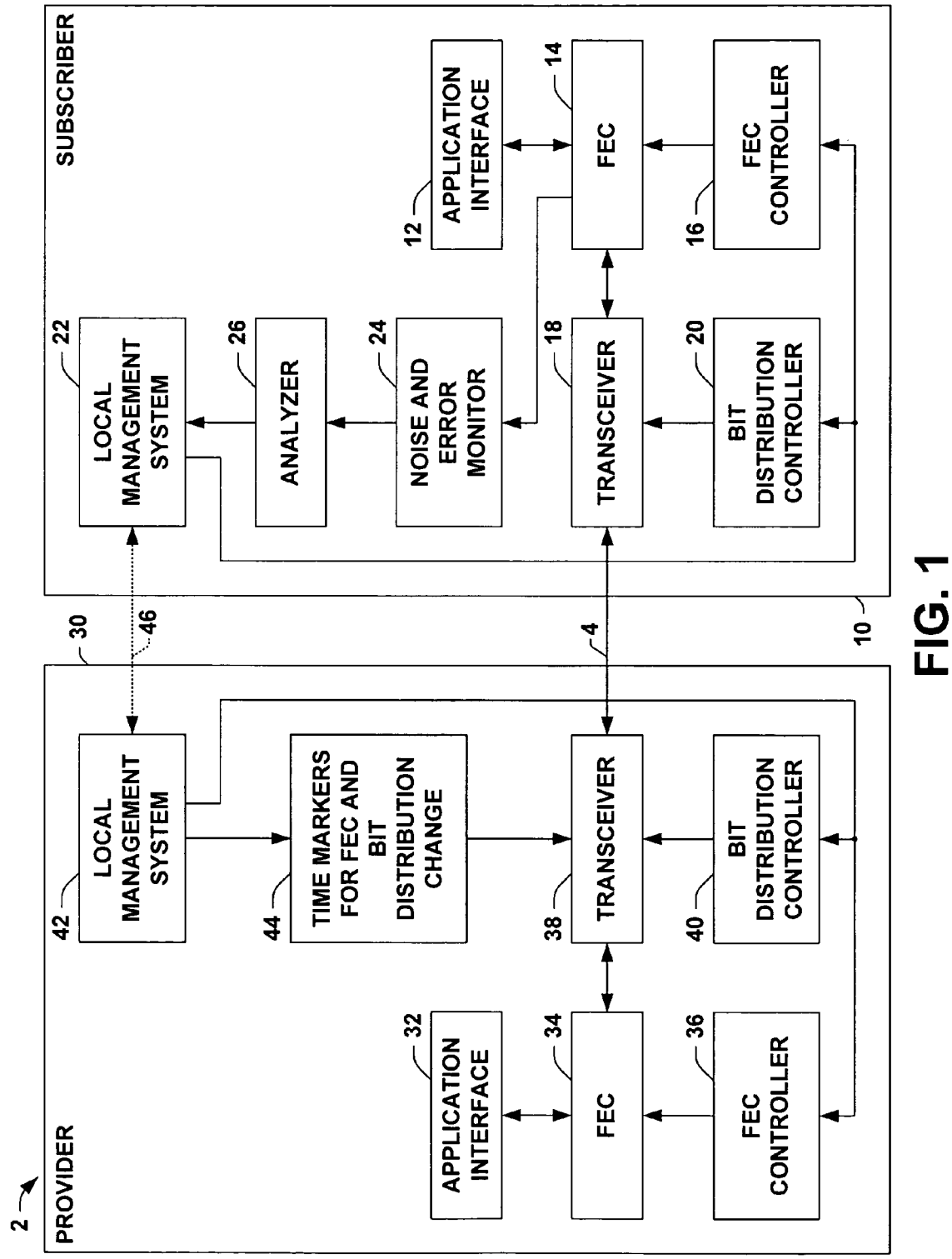
FIG. 1 is a schematic diagram illustrating an exemplary multicarrier DSL communication system with first and second DSL modems coupled with a communication channel or loop in accordance with one or more aspects of the present invention.

One or more implementations of the present invention will now be described with reference to the attached drawings, wherein like reference numerals are used to refer to like elements throughout. The invention relates to communication systems and methods for adaptive adjustment of system parameters to combat impulse noise, which is hereinafter illustrated in the context of an exemplary DSL multicarrier communication system using Discrete Multitone Transmission (DMT) modulation with Forward Error Correction (FEC) comprising Interleaving (IL), and their parameters adjustment for impulse noise protection, as well as bit swapping and rate adaptation for continuous noise protection. However, the invention finds utility in association with any type of communication systems, including but not limited to DSL systems, and single or multicarrier communication systems wherein any type of impulse noise protection techniques may be employed and dynamically adjusted according to impulse noise conditions. The invention involves monitoring impulse noise conditions and adjusting impulse noise protection parameters during the provision of communication services, wherein the various aspects of the invention may be carried out alone or in combination with initialization adjustments in a communication system. In this regard, the acts occurring during communication service in accordance with the invention are distinct from those occurring in a system initialization, wherein initialization involves exchange of control and/or test signals or information for a limited period of time, whereas communication service involves transfer of user data or information that may continue for very long periods of time. The invention may thus provide for continuous adaptation of impulse noise protection for changing noise conditions, whereas conventional initializations measure noise only for a short time and then provide one fixed set of parameters.

FIG. 1 illustrates an exemplary multicarrier DSL communication system 2 in which one or more aspects of the invention may be implemented, comprising first and second DSL modems 10 and 30, respectively, coupled with a communication loop or channel 4. The exemplary communication channel 4 is a twisted pair or copper wires in a conventional residential telephone system, although the invention may be employed in communication systems employing any type of communication channel 4 by which data can be transferred between the modems 10 and 30. The exemplary modems 10 and 30 are DSL modems having suitable circuitry for providing DSL communication service on the channel 4 generally in accordance with ANSI T1.413 (ADSL), T1.424 (VDSL) and other DSL standards, including performance of the tasks and functions described herein.

In the illustrated system 2, the first modem 10 is a subscriber modem that may be located in a residential home, and the second modem 30 is located at a DSL service provider. Data is transferred in both directions along the channel 4, wherein the subscriber modem 10 transmits data to be received by the provider modem 30 and the provider modem 30 transmits data to be received by the subscriber modem 10. In this regard, the exemplary communication system 2 is symmetrical, although the various aspects of the invention may be carried out in other systems in which data is transferred in a single direction only. In order to appreciate the various aspects of the invention, the exemplary system 2 and the various methods of the invention are hereinafter described with respect to data being transferred in a first direction from the provider modem 30 to the subscriber modem 10. Accordingly, in the following discussion, the first modem 10 (specifically, a transceiver 18 thereof) may be referred to as a "receiver" and the second modem 30 (specifically, a transceiver 38 thereof) may be referred to as a "transmitter" for purposes of describing the various aspects of the invention, with the first (receiver) modem 10 monitoring and analyzing continuous and impulse noise and proposing noise protection parameter changes to the second (transmitter) modem 30, which then institutes the changes. However, it will be appreciated that both modems 10 and 30 are capable of transmitting and receiving data in the illustrated implementation, wherein the modems 10 and 30 may both be configured to monitor noise with respect to data received thereby and to selectively propose and to institute noise protection parameter changes in a cooperative manner with the other modem.

In the exemplary system 2, the first modem 10 is adapted to monitor impulse noise (e.g., corrected and uncorrected packetized errors, etc.) with respect to data received on the communication channel 4 from the second modem 30 during communication service. The first modem 10 analyzes the monitored impulse noise and selectively proposes appropriate noise protection parameter changes to the second modem 30. The modems 10 and 30 are adapted to cooperatively adjust impulse noise protection for transferring data from the modem 30 to the modem 10 (e.g., by selectively adjusting the codeword format including the number of FEC redundancy bytes and/or the codeword size, and/or by selectively adjusting the amount of interleaving,) according to the observed impulse noise without interrupting the communication service. In accordance with another aspect of the invention, moreover, the exemplary first modem 10 is further adapted to monitor continuous noise with respect to data received from the second modem 30 (e.g., SNR, non-packetized errors, etc.) on the communication channel 4 during the communication service, wherein the modems 10 and 30 are further adapted to cooperatively adjust impulse noise protection and continuous noise protection in the system according to the impulse noise and the continuous noise in a coordinated fashion to minimize redundancy without communication service interruption.

The exemplary first modem 10 comprises a transceiver 18 that is coupleable to the channel 4 and operates to support communication (e.g., DSL) service with the second modem 30. With respect to received data from the second modem 30, the transceiver 18 operates to receive such data from the channel 4. The first modem 10 also comprises an application interface 12 to a host system, such as a service subscriber's home computer (not shown), wherein the second modem 30 also comprises an application interface 32 with a network node (not shown). The FEC system 14 of the first modem 10 comprises an FEC decoder and a de-interleaver operating in conjunction with an FEC controller 16, wherein the forward error correction (FEC) system 34 of the second modem 30 includes an FEC encoder and an interleaver with a corresponding FEC controller 36, where the FEC system 34 provides redundancy bytes to outgoing data when transmitting to the first modem 10. The FEC system 14 of the receiving first modem 10, in turn, uses received redundancy bytes to correct errors in incoming data (when receiving data from the second modem 30). In a bidirectional setting, the FEC system 14 of the first modem 10 further provides selective interleaving and encoding of outgoing data (when transmitting data to the second modem 30) and the FEC system 34 of the second modem 30 provides de-interleaving of incoming data (when receiving data from the second modem 30), wherein the exemplary FEC systems 14 and 34 each comprises suitable logic circuits for controlling the FEC/IL functions described herein, as well as memory for buffering data to be interleaved/de-interleaved.

The transceiver 18 of the first modem 10 provides demodulation of incoming data from the second modem 30, and includes suitable analog circuits for interfacing with the communication channel 4 for receipt of incoming data. In the second modem 30, the transceiver 38 provides for tone ordering or bit distribution, wherein outgoing data bits to be transmitted over each subcarrier are encoded as signal points in signal constellations using bit distribution parameters provided by a bit distribution controller 40. The transceiver 38 of the second modem 30 also modulates the outgoing subcarrier constellations (in the presented example using inverse discrete Fourier transform (IDFT)) and provides the modulated signals to the channel 4 according to subcarrier gain scale settings from the controller 40. For incoming data received from the second modem 30, the transceiver 18 of the first modem 10 demodulates the received signals into individual subcarrier constellations (e.g., by discrete Fourier transform or DFT techniques in the presented example), and decodes the received constellations according to the parameters from a corresponding bit distribution controller 20.

The first modem 10 also includes a local management system 22 that provides the FEC/IL parameters to the FEC controller 16 for the number of redundancy bytes in the received data and the amount or level of de-interleaving thereof, and also provides the bit distribution settings or parameters to the controller 20, including subcarrier bit allocations, gain settings, etc. for decoding and demodulation of the incoming data received from the channel 4. The FEC system 14 then performs de-interleaving and error correction according to parameters from the FEC controller 16, and provides the resulting incoming data to the application interface 12.

The second modem 30 implements similar functionality with respect to normal DSL communication service, and comprises a transceiver 38 coupled with the channel 4, a bit distribution system 40 that controls the modulation (demodulation) and encoding (decoding) of data in the transceiver 38. The second modem 30 further comprises an application interface 32 for interfacing to a host system (not shown), as well as an FEC system 34 and a corresponding FEC controller 36 for providing data interleaving and forward error correction functions similar to those described above with respect to the first modem 10. The second modem 30 also includes a local management system 42, providing control parameters and settings to the FEC controller 36 and to the bit distribution controller 40.

The local management systems 22 and 42 of the first and second modems 10 and 30, respectively, exchange control information and messages with one another via a local management channel 46, such as one of the subcarriers of the communication channel 4 using any suitable communication or data exchange protocol, so as to coordinate parameters settings, rate adjustments, timing of changes, etc. In particular, the local management systems 22 and 42 exchange bit distribution and gain settings for use by the respective bit distribution controllers 20 and 40, as well as FEC/IL and codeword size settings for use by the respective FEC controllers 16 and 36. In the illustrated system 2, the local management systems 22 and 42 exchange settings and information via the management channel 46 during system initialization for establishing initial subcarrier bit capacities and gain settings based on initial measurements of the subcarrier continuous noise levels (e.g., SNR). For instance, during initialization, the signal-to-noise ratio (SNR) for each subcarrier is obtained, and the maximum bit capacity of each subcarrier is determined by one of the modems 10, 30. This information is sent to the other modem, such that upon initiating DSL service, the modems are using the same parameters. Likewise, FEC/IL parameters and codeword size are initially set by one of the modems, according to initial noise measurements or according to some other criteria (e.g., max protection), with the settings being replicated to the other modem via the management channel 46.

In accordance with the present invention, the exemplary first modem 10 also comprises a noise and error monitor system 24 and an analyzer 26, wherein the monitor system 24 monitors data transfer errors occurring on the communication channel 4 for incoming data received from the second modem 30 via error information from the FEC system 14 during DSL service, and the analyzer 26 determines whether the incoming data transfer errors indicate the presence of impulse noise on the channel 4. In particular, the analyzer 26 determines whether any of the incoming data transfer errors are packetized errors (e.g., relatively large errors of short duration), and whether such packetized errors are corrected or uncorrected by the FEC system 14. Either or both of the analyzer 26 and the monitor system 24, and/or any of the other components of the first modem 10 illustrated in FIG. 1 may be fabricated together with the transceiver 18 as a single integrated circuit. It is noted that the exemplary second modem 30 also comprises noise monitoring and analyzing components (not shown) for monitoring and analyzing noise and data transfer errors for data transferred from the first modem 10 to the second modem 30, wherein the various impulse noise protection adjustment features of the invention are provided for data being transferred in both directions along the channel 4 in the exemplary system 2.

As illustrated and described further below with respect to FIGS. 2-5, based on the assessment of the impulse noise situation on the channel 4 for data received in the first modem 10, the analyzer 26 selectively recommends changes to the impulse noise protection to the local management system 22 (e.g., changes to FEC/IL parameters and codeword size in this example). The management system 22, in turn cooperatively interacts with the corresponding management system 42 of the second modem 30 to coordinate synchronized implementation of such changes of impulse noise protection parameters in the system 2 without interrupting the communication service. The management system 42, in turn, prompts the second modem 30 to provide time markers 44 for FEC and bit distribution changes to co-ordinate changes in the settings of both modems without service interruption on the channel 4.

In particular, the analyzer 26 analyzes received data error information and suitable statistics based thereon, and recommends increasing impulse noise protection (e.g., increasing interleaving within memory and/or latency limitations, increasing the number of FEC redundancy bytes, and/or decreasing codeword size) if the current impulse noise protection is deemed to be ineffectual based on the current impulse noise situation (e.g., uncorrected packetized errors). The analyzer 26 may alternatively recommend decreasing impulse noise protection to increase efficiency of the system (e.g., increasing codeword size, decreasing FEC redundancy, and/or decreasing interleaving) if the current impulse noise protection is deemed to be excessive for the current impulse noise situation (e.g., no uncorrected packetized errors and corrected packetized errors less than a threshold value). Furthermore, the analyzer 26 may suggest to leave the FEC/IL and codeword size settings unchanged if it is determined that the current protection is adequate and not excessive. In this manner, the system 2 provides for dynamic optimization of the tradeoff between impulse noise protection and data rate to a much greater extent than it was possible in conventional systems in which the impulse noise settings were left unchanged during DSL service.

In addition to the adaptive impulse noise protection adjustments of the invention, the exemplary modems 10 and 30 may also provide for adaptive adjustment to continuous noise protection, wherein the continuous noise and impulse noise parameter adjustments may be coordinated so as to minimize system redundancy, as illustrated and described in greater detail below with respect to FIGS. 6-7A. In this regard, the noise and error monitor 24 of the exemplary first modem 10 also monitors continuous noise in the subcarriers of the communication channel 4, and the analyzer 26 proposes changes to the continuous noise protection parameters accordingly. These parameter changes can involve any form or type of continuous noise protection, including but not limited to bit swapping and seamless rate adaptation techniques, wherein the protection may be increased at the expense of data rate, or the protection may be reduced to improve the data rate.

Figure 2:
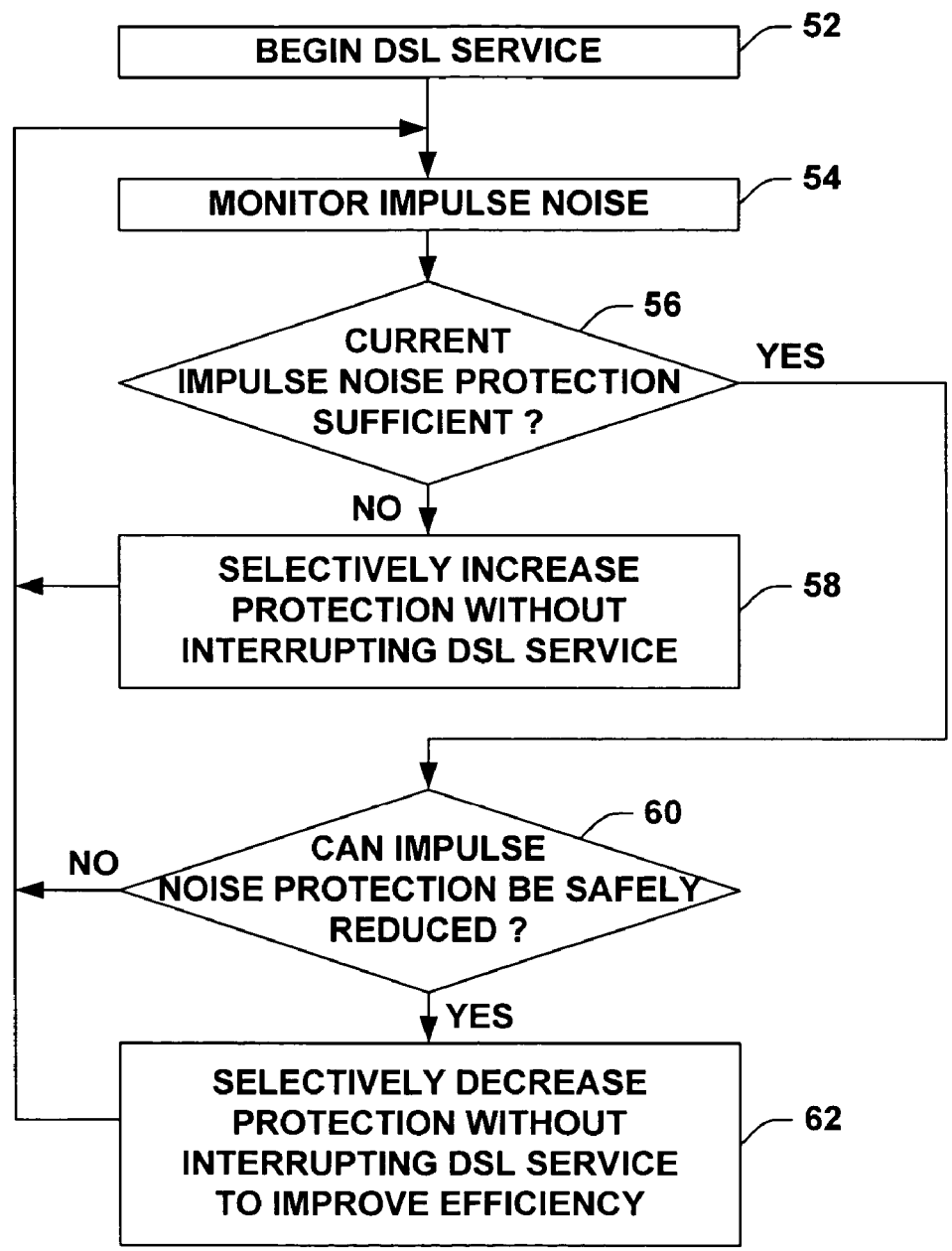
FIG. 2 is a flow diagram illustrating a simplified method of adjusting a communication system for adapting to changing impulse noise in accordance with the invention.
Figure 3:
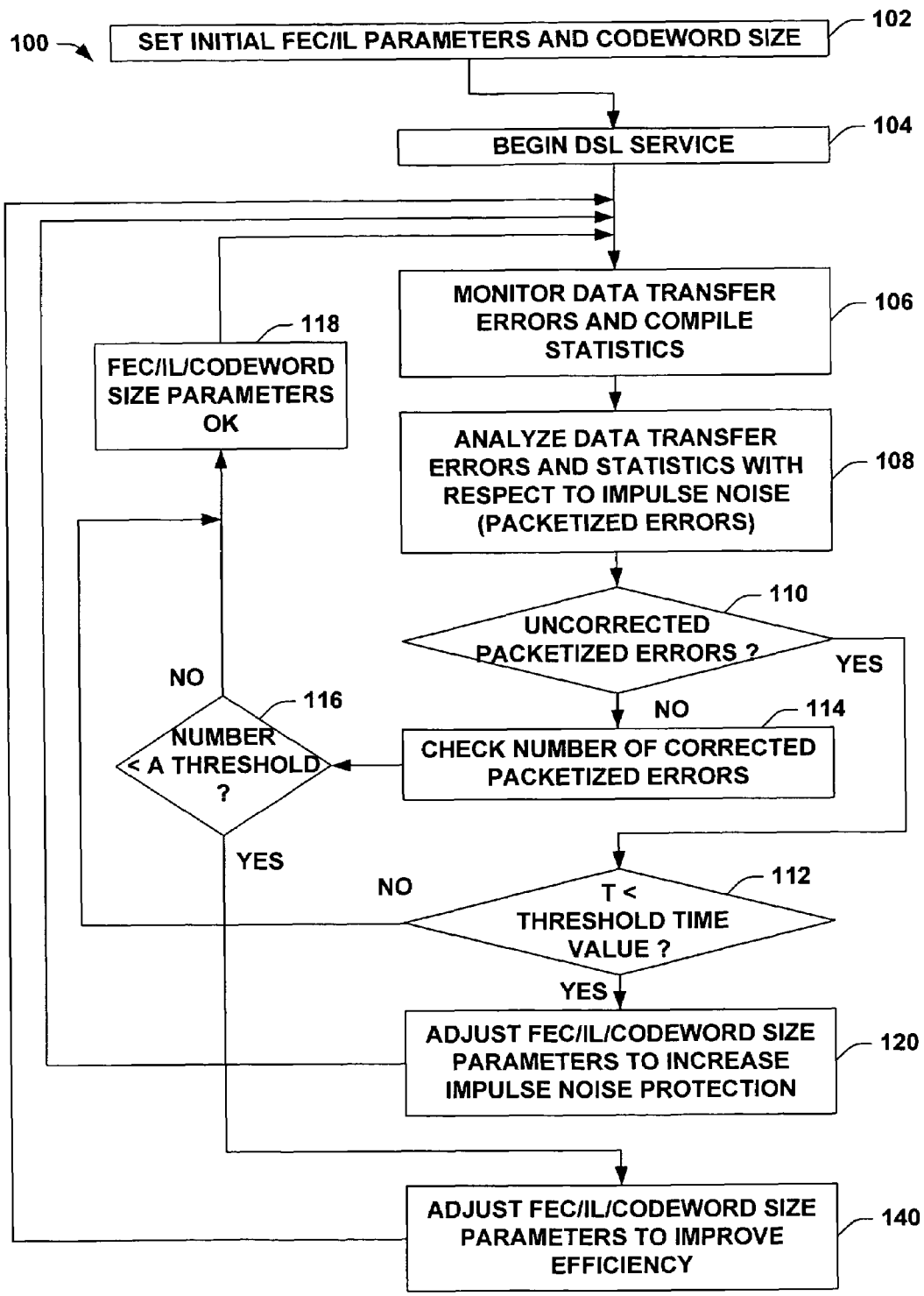
FIG. 3 is a detailed flow diagram illustrating a more detailed method of adjusting a communication system for adapting to changing impulse noise in accordance with the invention.
Figure 4:
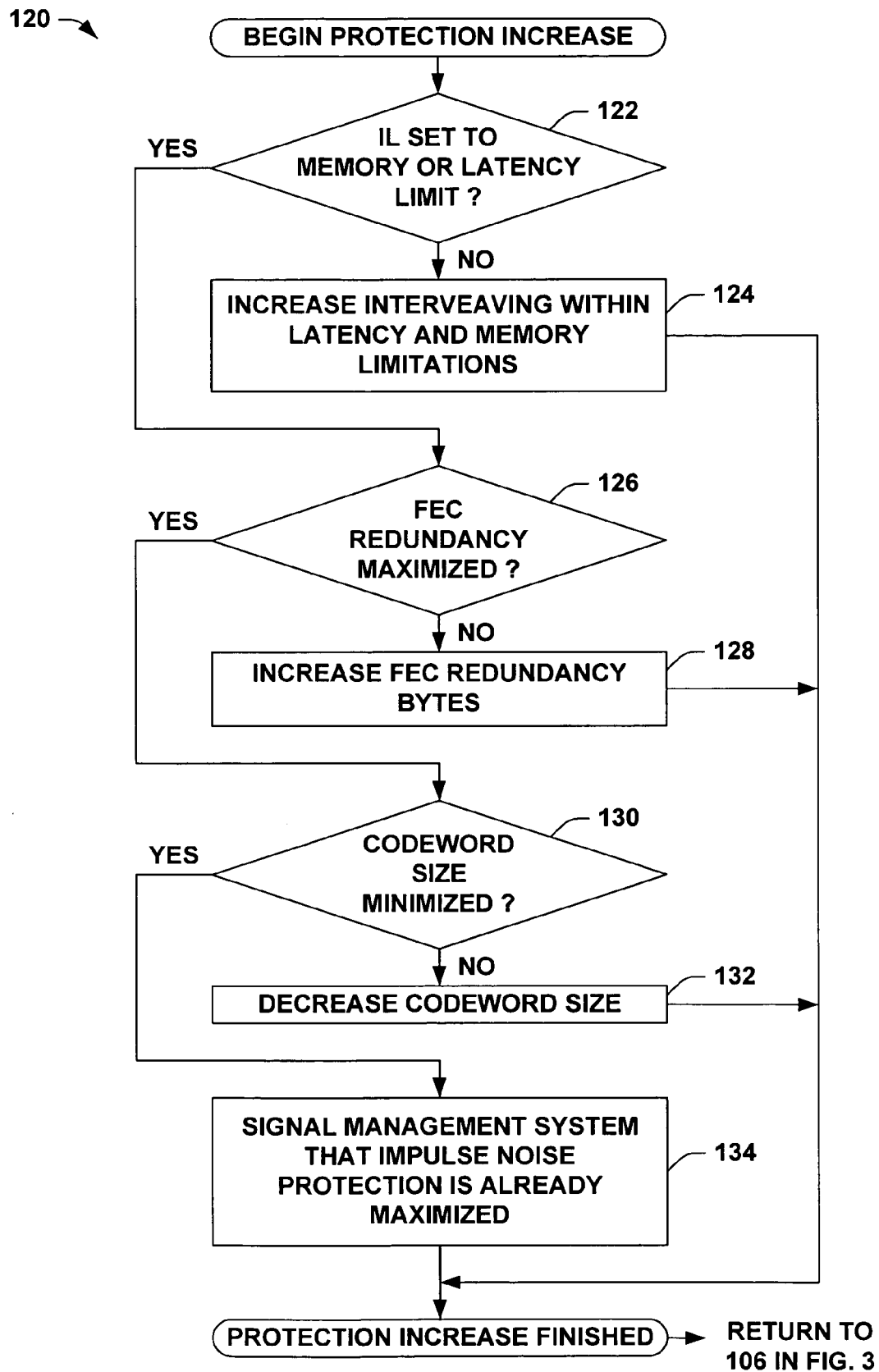
FIG. 4 is a detailed flow diagram further illustrating increasing impulse noise protection in the method of FIG. 3.
Figure 5:
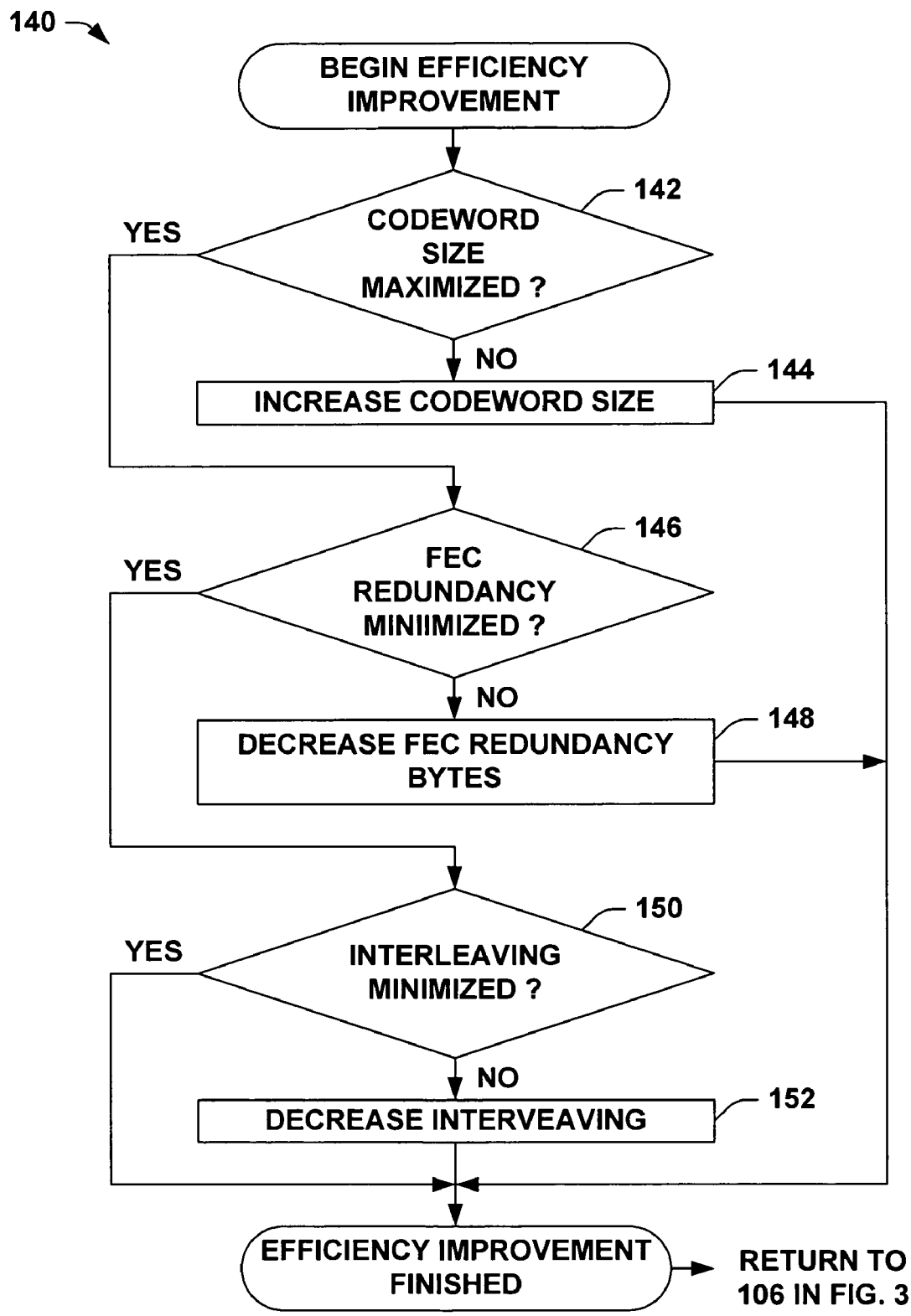
FIG. 5 is a detailed flow diagram further illustrating increasing efficiency by decreasing unnecessary impulse noise protection in the method of FIG. 3.

Referring now to FIGS. 2-5, exemplary methods are illustrated for selective adjustment of impulse noise protection in a communication system in accordance with the present invention, wherein FIG. 2 illustrates a simplified method 50 and a more detailed method 100 is illustrated in FIGS. 3-5. In this regard, the various components of the system 2 above and other systems of the invention include suitable circuitry, state machines, firmware, software, logic, etc. to perform the various methods and functions illustrated and described herein, including but not limited to the exemplary methods described below. While the methods 50 and 100 and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., the system 2 in FIG. 1 above) as well as in association with other systems not illustrated, wherein all such implementations are contemplated as falling within the scope of the present invention and the appended claims.

In the method 50 of FIG. 2, DSL service begins at 52, and impulse noise is monitored at 54 during the DSL service. It is noted at this point that the impulse noise monitoring, analysis, and selective protection parameter adjustment features of the invention are undertaken after DSL service has begun. Moreover, the techniques of the present invention may be employed alone or in combination with pre-DSL service parameter adjustments or initialization routines such as those described above. As illustrated and described below with respect to FIGS. 3-5, the impulse noise may be monitored during DSL service by accumulating statistics of data transfer errors (e.g., in the noise and error monitor system 24 of FIG. 1) and analyzing such statistics with respect to the existence of packetized errors (e.g., in the analyzer system 26 of FIG. 1), including whether and how many such packetized errors have occurred in the channel 4 and how many of these are corrected and/or uncorrected by the current FEC redundancy settings. Other suitable monitoring and analysis techniques may be employed at 54 and 56, by which the existence and severity of channel impulse noise is ascertained, wherein all such variant implementations are contemplated as falling within the scope of the invention and the appended claims.

At 56-62, the impulse noise protection is selectively adjusted or adapted according to the monitored impulse noise in the channel without interrupting the communication service. At 56, a determination is made as to whether the current impulse noise protection is adequate or sufficient, based on the monitored impulse noise. If not (NO at 56), the impulse noise protection is selectively increased at 58 without interrupting the DSL service, and the method 50 returns to 54 to continue impulse noise monitoring. In the detailed examples illustrated and described below with respect to FIGS. 3-5, interleaving levels, FEC redundancy, and codeword size are adjusted to change the impulse noise protection. However, any single operational parameter or multiple operational parameters of a communication system may be adjusted at 58 by which protection against impulse noise is increased, wherein all such alternative implementations are contemplated as falling within the scope of the invention and the appended claims. In this regard, the method 50 and other methods of the invention facilitate adaptive adjustment without service interruption to accommodate situations where channel impulse noise worsens or improves after DSL service has begun. Thus, even where the parameters are initially tuned or selected according to an initial characterization of the noise environment, the present invention advantageously provides dynamic adjustment to facilitate optimal tradeoff between current noise conditions that change from time to time and system efficiency to an extent not possible using prior techniques.

If the current impulse noise protection is sufficient (YES at 56), a determination is made at 60 as to whether the impulse noise protection can be safely reduced. If so (YES at 60), the impulse noise protection is selectively decreased at 62 without service interruption, and the method 50 returns to 54 to continue impulse noise monitoring. In the exemplary implementations illustrated and described below with respect to FIGS. 3-5, interleaving levels are decreased, FEC redundancy is decreased, and/or codeword size is increased to reduce the impulse noise protection. However, any single or multiple operational parameters of a communication system may be adjusted at 62 by which excess protection against impulse noise is reduced, wherein all such alternative implementations are contemplated as falling within the scope of the invention and the appended claims. In this manner, the method 50 facilitates improvement in system efficiency (e.g., increased data rate by decreased impulse noise protection) in situations where the channel impulse noise decreases. If the impulse noise protection cannot be safely reduced, (NO at 60), the method returns to monitor impulse noise at 54 without adjusting the impulse noise protection settings.

Referring now to FIGS. 1 and 3-5, a more detailed method 100 is illustrated and described hereinafter for adjusting a communication system in accordance with the invention. At 102 in FIG. 3, initial impulse noise protection parameters are set. For example, in the system 2 of FIG. 1, the number of FEC redundancy bytes, the amount of interleaving, and the initial codeword size may be set by the FEC controllers 16 and 36 in the first and second modems 10 and 30, respectively. This may be a single fixed setting of the level of interleaving, number of FEC redundancy bytes, and codeword size, for example, to maximize the initial protection against impulse noise, or may by done based on an initial measurement, estimate, or other assessment of the impulse noise conditions in the channel 4 during the initialization, or may be an iterative initialization process to set the initial FEC/IL and codeword size parameters, such as the above-described techniques, after which DSL service begins at 104.

At 106, data transfer errors are monitored by the first modem 10, wherein the noise and error monitor system 24 obtains data transfer error information from the FEC system 14 relating to errors detected and corrected in incoming data from the channel 4. In the illustrated systems, this error data indicates the number of errors detected by the error monitor 24, as well as the number of errors that were corrected by the FEC system 14. From this information, the monitor system 24 compiles statistics at 106, such as information indicating temporal grouping or packetizing or randomness of the errors, thereby allowing analysis of whether the errors are related to impulse noise, continuous noise, or both. At 108, the analyzer system 26 in the first modem 10 analyzes the error data and the compiled statistics to ascertain the existence and extent of any packetized errors, and may also characterize the relative frequency or infrequency of occurrence of packetized errors.

Packetized errors include any errors attributable, in whole or in part, to impulse noise. For instance, many data errors occurring in a short period of time (e.g., hundreds or even thousands of errors in one second) may be considered by the analyzer system 26 as packetized, whereby the analyzer 26 may presume at 108 that impulse noise is occurring in the channel 4. In this regard, the error information and statistics may cover or be evaluated with respect to a certain time period of interest, for example, the most recent few minutes or hours, or any suitable time period, such that any noise protection changes based thereon will be correlated to the current noise conditions in the communication channel 4. Moreover, the analyzer 26 may selectively refrain from increasing impulse noise protection where it determines that detected impulse noise is occurring relatively infrequently. Thus, for example, if a burst of impulse noise related errors is the first such event detected in a very long time, the analyzer 26 may decide not to make any changes, such that system efficiency is optimized where impulse noise related errors only occur once in a selectable long time period.

At 110, the analyzer system 26 determines whether there are any uncorrected packetized errors over the time period of interest (packetized errors are detected, which are not corrected by the forward error correction system 14). If not (NO at 110), the analyzer 26 concludes that any packetized errors have been corrected, and a number of corrected packetized errors in the relevant time period is checked at 114. In this regard, it is noted that the number of FEC redundancy bytes currently being employed in the system 2 are selected so as to be able to correct for a certain number of error bytes per codeword. Thus, in one example the current FEC settings (e.g., number of redundancy bytes) may correct for N error bytes per codeword. The analyzer 26 may determine or be programmed with a threshold value against which to compare the number of corrected packetized errors at 114, for example, N/2 or other threshold value. In this case, the analyzer 26 determines at 116 whether the number of corrected packetized errors is less than the threshold value (including no packetized errors, where the number is zero). If not (NO at 116), the analyzer 26 concludes at 118 that the current FEC/IL and codeword size settings are appropriate to the current impulse noise conditions in the channel 4, since all errors related to impulse noise in the relevant time period are being corrected, and the current impulse noise protection settings are not excessive (e.g., little if any data rate sacrifice). In this case, the analyzer 26 leaves the impulse noise protection settings unchanged at 118, and the method 100 returns to impulse noise monitoring at 106.

If the number of corrected packetized errors is less than the threshold value (YES at 116, including the case where the number is zero), the analyzer 26 concludes that there may be excess impulse noise protection relative to the current impulse noise conditions in the channel 4. In this case, the analyzer 26 presumes that the current or recent impulse noise in the channel 4 is small or negligible and the method 100 proceeds to 140, where the FEC/IL/codeword size parameters are adjusted to reduce the amount of impulse noise protection and hence to improve the data rate/system efficiency. Further details of the exemplary impulse noise protection decrease/efficiency improvement at 140 are illustrated and described below with respect to FIG. 5. Furthermore, the adjustment at 140 may be performed in concert with bit swapping, SRA, or other parameter changes directed to increasing or decreasing protection against continuous noise, as illustrated and described further below with respect to FIGS. 6-7B. Thereafter, the method 100 returns to continue data error monitoring and statistical analysis at 106 and 108.

If there are uncorrected packetized errors (YES at 110), the analyzer 26 checks the time duration since the last undetected error event at 112. In this regard, the fact that the analyzer 26 detects an uncorrected error may not require a proposal to change the impulse noise protection, for example, where the detected packetized error represents a very rare event. The analyzer 26 accordingly ascertains the relevant observation time since the last detected uncorrected error, and if this time is longer than a threshold time value (e.g., as determined by Quality of Service (QoS) requirements for a particular service which may be programmable in the receiver modem 10, or as determined by other suitable criteria), no increase in protection is needed. If this time is less than the threshold time value (YES at 112, e.g., less than the minimum time between two error events allowed by the specific requirements for QoS), the analyzer 26 concludes that the current impulse noise protection settings are insufficient to combat errors resulting from the current impulse noise conditions in the channel 4. In this case, the method 100 proceeds to 120, where the impulse noise protection settings (e.g., codeword size, FEC redundancy, and interleaving depth) are adjusted to increase the impulse noise protection. Thereafter, the method 100 returns to 106 and 108 to continue monitoring and analyzing the error data and statistics. If the time duration since the last uncorrected packetized error even is sufficiently long (NO at 112), the method 100 proceeds to 118, wherein the analyzer 26 concludes that the current FEC/IL and codeword size settings are appropriate to the current impulse noise conditions in the channel 4, and leaves the impulse noise protection settings unchanged, after which the method 100 returns to impulse noise monitoring at 106.

FIGS. 4 and 5 illustrate further details of increasing impulse noise protection at 120 and increasing efficiency by decreasing unnecessary impulse noise protection at 140, respectively, in the method 100 of FIG. 3. Once the analyzer 26 has determined that an increase in the impulse noise protection is desired (e.g., uncorrected packetized errors in rather short time intervals have been detected, YES at 112 in FIG. 3), the exemplary analyzer 26 proposes increased interleaving, increased FEC redundancy, or decreased codeword size in prioritized fashion, as illustrated in FIG. 4. The analyzer 26 initially determines at 122 in FIG. 4 whether the interleaving is currently maximized with respect to latency limitations of the particular DSL service being provided, and/or whether buffer memory limitations prevent further interleaving increase. In this regard, increasing the level or amount of interleaving will help to prevent uncorrected packetized errors for a given amount of FEC redundancy, but will result in increased buffer memory usage to store outgoing data being interleaved and incoming data being de-interleaved, and will also result in increased latency in delivering data across the communication channel 4. Accordingly, in this example memory availability and/or the amount of tolerable latency may limit the amount of interleaving that can be used in a given application.

If the current interleaving settings are not maximized with respect to such memory or latency limitations (NO at 122), the interleaving is increased at 124 within such limits without DSL service interruption, and the impulse noise protection increase 120 is finished (e.g., the method 100 returns to 106 in FIG. 3). The adjustments to increase impulse noise protection by increasing interleaving at 124, and/or those adjustments which increase FEC redundancy or decrease codeword size below (e.g., as well as changes in FIG. 5 to decrease impulse noise protection), are accomplished in the exemplary system 2 by the analyzer 26 proposing such parameter changes, and the local management systems 22 and 42 exchanging messages, parameter values, and time markers 44 through the local management channel 46 to implement the proposed changes in a coordinated fashion without interrupting the DSL communication service.

If the interleaving settings are already maximized according to some predetermined criteria (YES at 122), the analyzer makes a determination at 126 as to whether the current FEC redundancy settings are maximized. If not (NO at 126), the number of FEC redundancy bytes is increased at 128 (again without interrupting the communication service on the channel 4), and the impulse noise protection increase 120 is finished. Changes to the FEC redundancy settings may be performed in any suitable manner at 128 within the scope of the invention. However, if the current FEC redundancy is already maximized (YES at 126), the analyzer 26 makes a determination at 130 as to whether the current codeword size is minimized. If not (NO at 130), the codeword size is decreased at 132 without service interruption, and the method 100 returns to 106 in FIG. 3 to continue monitor and analyzing error data. If the codeword size is already minimized (YES at 130), the analyzer 26 signals the local management system 22 at 134 that the impulse noise protection is already maximized, and the method 100 returns to 106 in FIG. 3.

FIG. 5 illustrates an exemplary prioritized implementation of the impulse noise protection reduction at 140 of the method 100, wherein the analyzer 26 recommends increasing codeword size, decreasing FEC redundancy, or reducing the amount of interleaving if impulse noise protection reduction is appropriate according to the current impulse noise situation in the channel 4. At 142 in FIG. 5, the analyzer 26 determines whether the current codeword size is maximized. If not (NO at 142), the codeword size is increased at 144 and the impulse noise protection decrease/efficiency improvement 140 ends. Thereafter, the method 100 returns to 106 and 108 in FIG. 3 to continue monitoring and analyzing the data errors and corresponding statistics.

If the current codeword size is already maximized (YES at 142 in FIG. 5), the analyzer 26 makes a determination at 146 as to whether the FEC redundancy is currently minimized (e.g., zero). If not (NO at 146), the FEC redundancy is decreased at 148, and the method 100 returns to 106 and 108 in FIG. 3 to continue monitoring and analyzing the error data and statistics. Otherwise (YES at 146), the analyzer 26 determines whether the current interleaving is minimized (e.g., zero) at 150. If so (YES at 150), the analyzer 26 does not recommend any changes, as the system is already optimized for minimum impulse noise protection, and the method 100 returns to monitor the error data at 106 in FIG. 3. Otherwise, (NO at 150), the interleaving is decreased at 152, and the method 100 returns to 106 in FIG. 3. Other suitable adjustment strategies or protocols can be used for selectively increasing or decreasing impulse noise protection, wherein the invention is not limited to the specific implementations of FIGS. 4 and 5 or the ordering of the parameter adjustments thereof.

Figure 6:
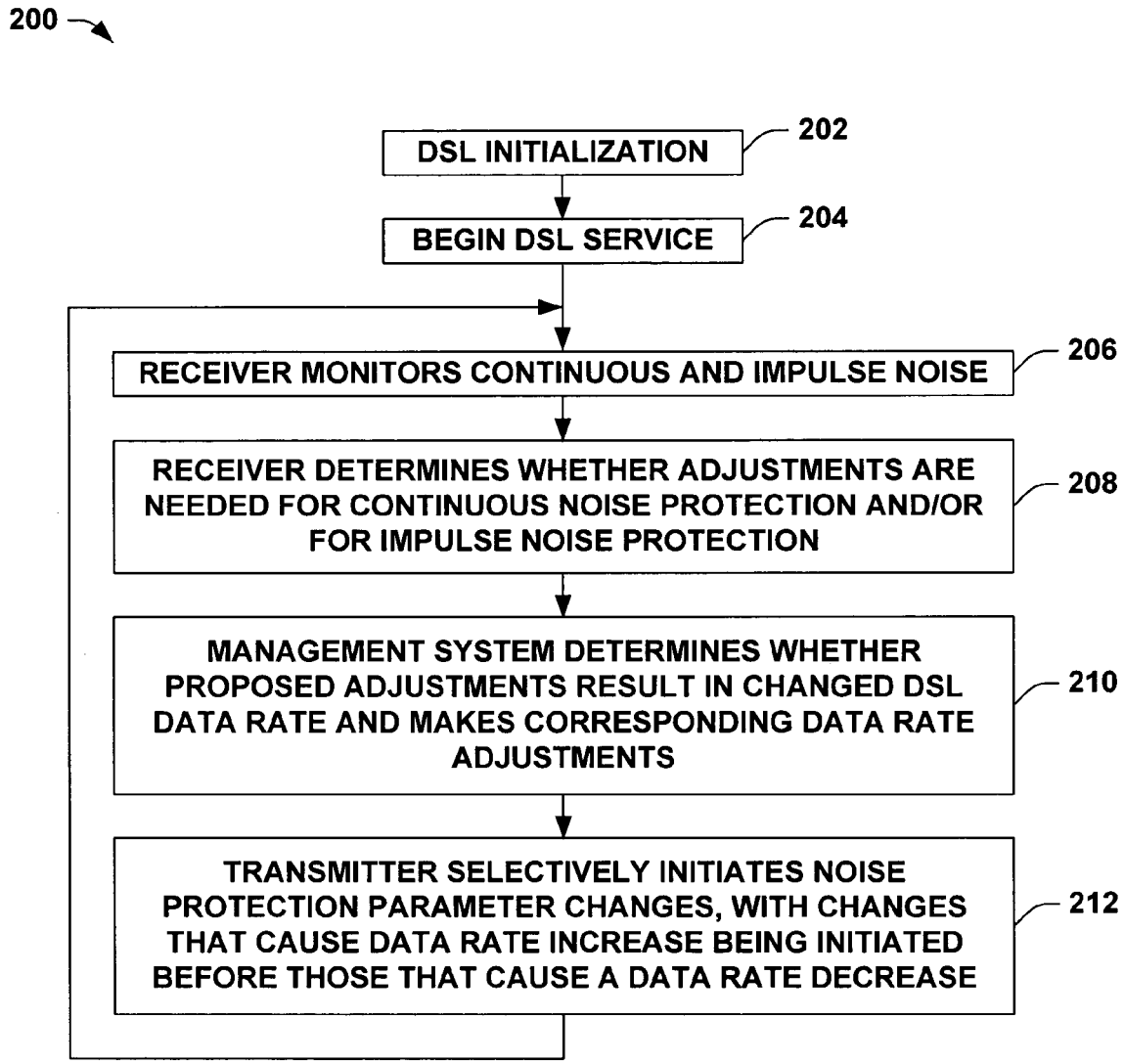
FIG. 6 is a flow diagram illustrating a simplified method of adjusting a communication system for changing impulse noise and/or changing continuous noise in accordance with the invention.

Referring now to FIG. 6, another aspect of the invention provides methods for adjusting a communication system, wherein one such method 200 is illustrated in FIG. 6. The method 200 may be implemented in any communication system, including but not limited to the exemplary multicarrier DSL system 2 of FIG. 1. DSL initialization is carried out at 202, with protection parameters for impulse and continuous noise being initially set, after which DSL service begins at 204. The receiver (e.g., the first modem 10 in FIG. 1) monitors continuous and impulse noise at 206, and determines whether adjustments are needed at 208 for impulse noise protection, continuous noise protection, or both. The monitoring at 206 may be carried, for example, by the noise and error monitor 24 in the first modem 10, and the determination at 208 may by done by the analyzer 26, with any proposed changes being provided to the first local management system 22 and from there to the management system 42 of the second (e.g., transmitter) modem 30.

At 210, the local management system (either the first management system 22 or the second management system 42 in FIG. 1) determines whether the proposed adjustments result in a data rate change, and if so, makes the corresponding rate adjustments. At 212, the transmitter initiates the requested changes to the noise protection parameters without communication service interruption, with changes that cause data rate increases being initiated prior to those that decrease the data rate, whereafter the method 200 returns to noise monitoring at 206. In accordance with an aspect of the invention, the coordinated adjustment of the continuous and impulse noise protection parameters is performed at 212 so as to minimize redundancy in the system 2, and to thereby optimize the data transfer rate.

Figure 7A:
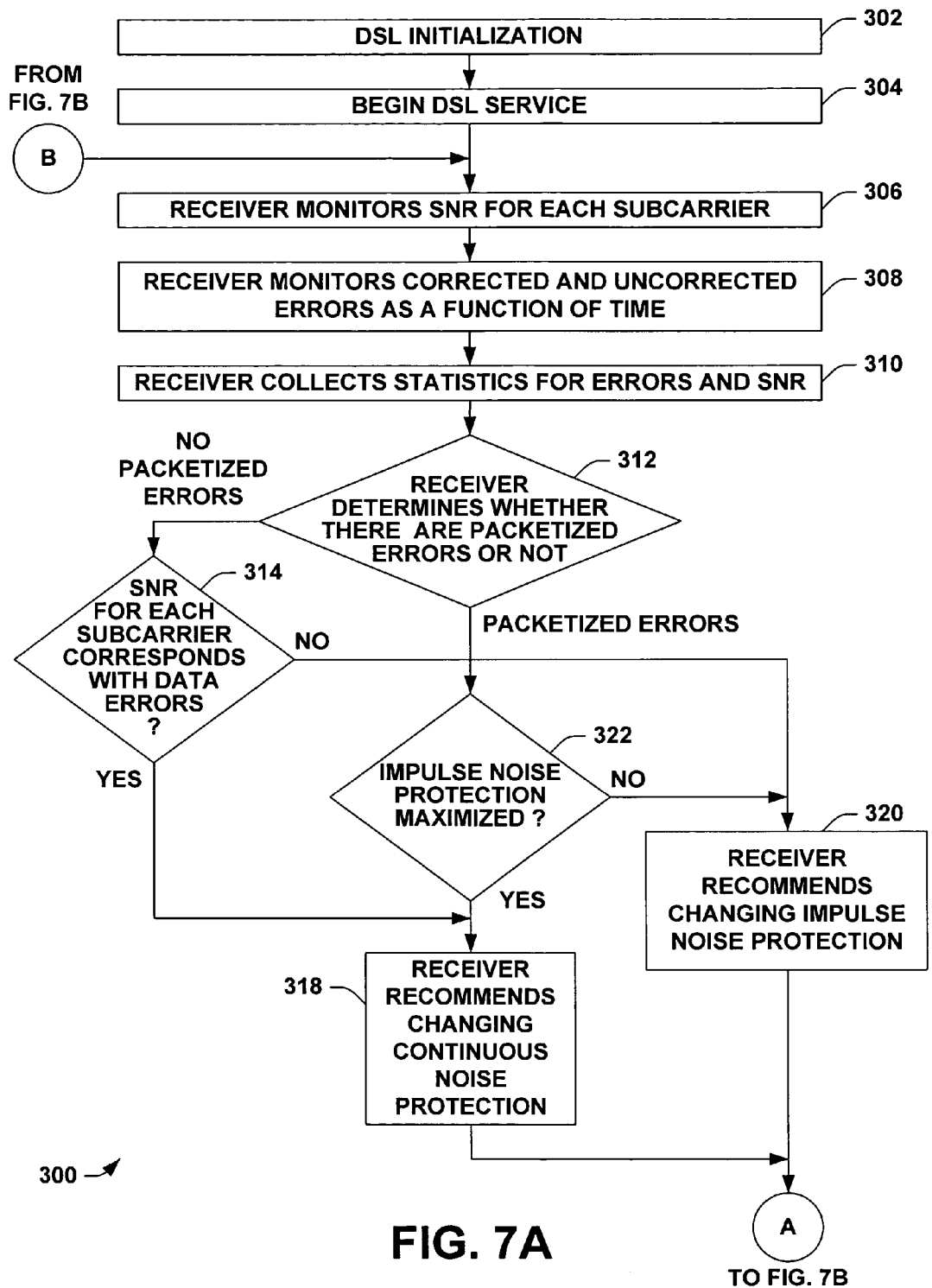
FIGS. 7A and 7B provide a flow diagram illustrating a more detailed method of adjusting a communication system for changing impulse noise and/or changing continuous noise in accordance with the invention.
Figure 7B:
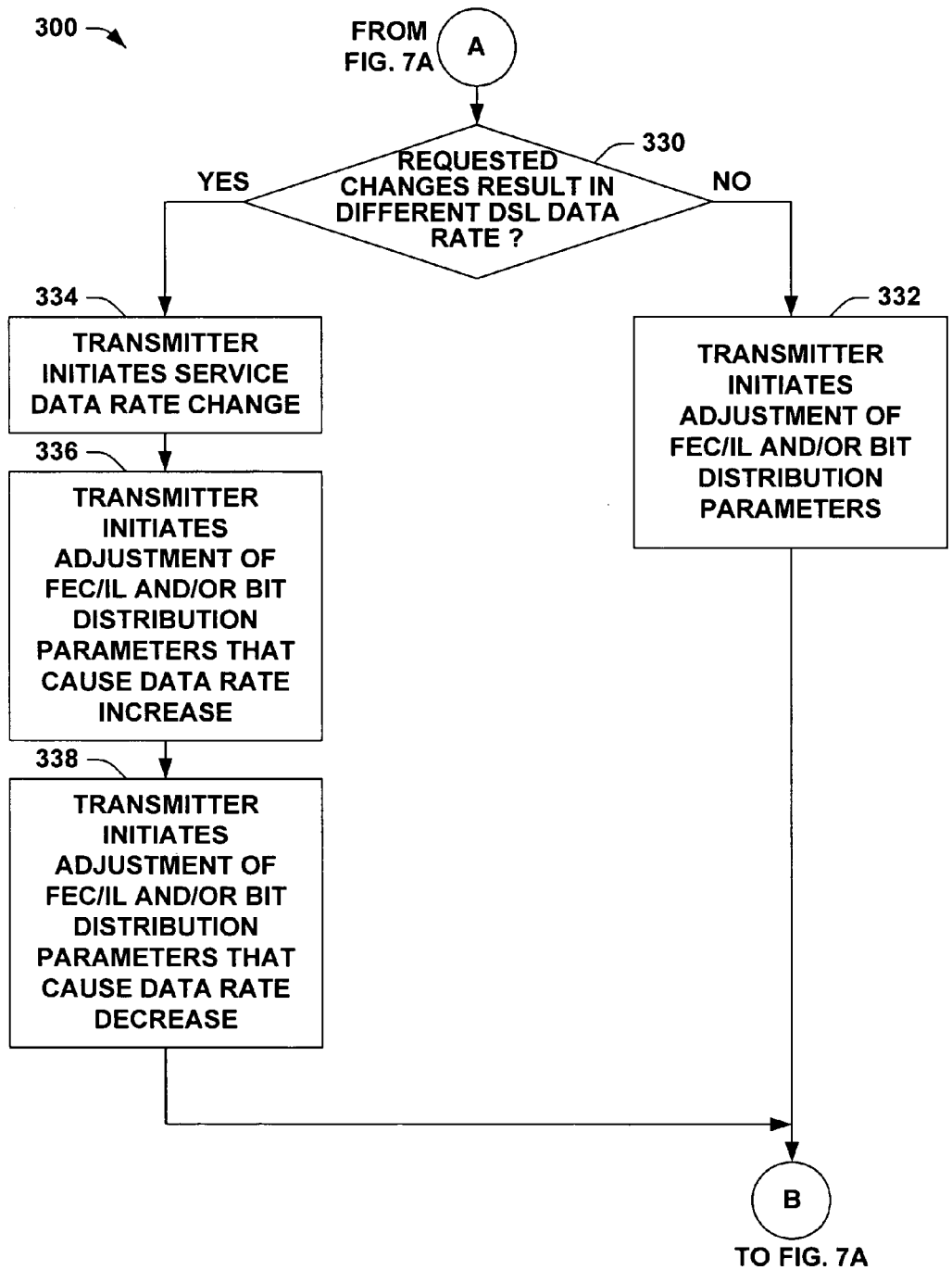

FIGS. 7A and 7B illustrate a more detailed method 300 for adjusting a communication system to adapt to changing impulse noise and/or continuous noise in accordance with the invention. At 302 in FIG. 7A, initial impulse and continuous noise protection parameters are set, and DSL service begins at 304. The receiver (e.g., the first modem 10 in FIG. 1) monitors the signal to noise ratio (SNR) for each subcarrier at 306 during DSL service. In addition, the receiver monitors corrected and uncorrected errors as a function of time at 308, and collects or compiles statistics for data transfer errors and SNR at 310. As described above, the noise and error monitor 24 and the analyzer 26 of the first modem 10 in FIG. 1 may perform the noise measurement and assessment acts at 306-310.

At 312, as determination is made as to whether the data errors are randomly distributed over received codewords, and/or whether data errors are concentrated in packets (e.g., packetized errors). If all the errors are randomly distributed and no packetized errors were observed (NO PACKETIZED ERRORS at 312), a determination is made at 314 as to whether the subcarrier SNR values correspond with the data errors. If not (NO at 314), the receiver recommends impulse noise protection changes at 320, and the method 300 proceeds to 330 in FIG. 7B, as described further below. If, however, there is certain correspondence between the subcarrier SNR and the random errors (YES at 314), the receiver recommends or proposes changes to the continuous noise protection at 318 (e.g., bit swapping, rate adaptation, etc.), and the method 300 also proceeds to 330 in FIG. 7B.

If packetized errors are determined (PACKETIZED ERRORS at 312 in FIG. 7A), the receiver determines at 322 whether the impulse noise protection is set to it maximum value. If not (NO at 322), the receiver recommends changes to impulse noise protection at 320 (e.g., without adjustments to continuous noise protection), and the method 300 proceeds to 330 in FIG. 7B as described below. However, if impulse noise protection is set to its maximum value (YES at 322), the receiver recommends or proposes changes to the continuous noise protection at 318 (e.g., changes in bit loading, mostly rate adaptation, but other adjustments may be made), and the method 300 proceeds to 330 in FIG. 7B.

Referring now to FIG. 7B, where changes to one or more of the impulse noise protection parameters and/or those affecting continuous noise protection are recommended by the receiver, the transmitter determines at 330 whether the requested changes result in a different data rate. If not (NO at 330), the transmitter initiates the requested parameter changes at 332, for example, through messaging between the local management systems 42 and 22 in FIG. 1 or other suitable protocol, wherein the changes may be implemented contemporaneously or certain changes may be implemented before others. The method 300 then returns to 306 in FIG. 7A and proceeds as described above. However, if the requested changes will result in a different data rate (YES at 330 in FIG. 7B), the transmitter first initiates the corresponding data rate change at 334, for example, using rate adaptation or other suitable data rate adjustment techniques. At 336, the transmitter then initiates adjustment of the requested parameters that result in data rate increase, prior to initiating the parameter changes that result in data rate decrease at 338, after which the method 300 then returns to 306 in FIG. 7A and proceeds as described above.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for adaptive adjustment of a communication system, the method comprising:
    monitoring impulse noise on a communication channel during communication service, wherein monitoring the impulse noise comprises:
        monitoring data transfer errors occurring on the communication channel;
        determining whether any of the data transfer errors are packetized errors; and
        determining a number of corrected packetized errors and a number of uncorrected packetized errors; and
    selectively adjusting impulse noise protection without interrupting the communication service by changing the impulse noise protection in a first manner if the number of uncorrected packetized errors is greater than an uncorrected packetized error threshold and changing the impulse noise protection in a second manner that differs from the first manner if the number of corrected packetized errors is less than a corrected packetized error threshold, wherein selectively adjusting the impulse noise protection comprises:
selectively increasing the impulse noise protection if there are uncorrected packetized errors during a relevant observation time that is less than a threshold time value;
selectively decreasing the impulse noise protection if there are no uncorrected packetized errors during the relevant observation time and if a number of corrected packetized errors is less than a threshold value during the relevant observation time; and
leaving the impulse noise protection unchanged if there are no uncorrected packetized errors during the relevant observation time and if the number of corrected packetized errors is greater than or equal to the threshold value during the relevant observation time.

2. The method of claim 1, wherein selectively increasing the impulse noise protection comprises at least one of increasing interleaving, increasing redundancy, and decreasing codeword size.

3. The method of claim 1, wherein selectively increasing the impulse noise protection comprises:
selectively increasing interleaving if possible within interleaving limits;
if increasing interleaving is not possible, selectively increasing a number of redundancy bytes if possible within redundancy limits; and
if increasing interleaving or redundancy is not possible, selectively decreasing codeword size if possible within codeword size limits.

4. The method of claim 1, wherein selectively decreasing the impulse noise protection comprises at least one of increasing codeword size, decreasing redundancy, and decreasing interleaving.

5. The method of claim 1, wherein selectively decreasing the impulse noise protection comprises:
selectively increasing codeword size if possible within codeword size limits;
if increasing codeword size is not possible, decreasing a number of redundancy bytes if possible within redundancy limits; and
if increasing codeword size is not possible and if decreasing the number of redundancy bytes is not possible, selectively decreasing interleaving if possible within interleaving limits.

6. The method of claim 1, further comprising:
monitoring continuous noise on the communication channel during the communication service; and
selectively adjusting continuous noise protection according to the continuous noise without interrupting the communication service, wherein the continuous noise protection and the impulse noise protection are adjusted in a coordinated fashion to minimize redundancy.

7. The method of claim 1, further comprising:
monitoring continuous noise on the communication channel during the communication service; and
selectively adjusting continuous noise protection according to the continuous noise without interrupting the communication service, wherein the continuous noise protection and the impulse noise protection are adjusted in a coordinated fashion to minimize redundancy.

8. A communication system, comprising:
a communication channel;
a first modem coupled with the communication channel, the first modem being adapted to monitor impulse noise and continuous noise on the communication channel during communication service and determine a number of corrected packetized errors and a number of uncorrected packetized errors during monitoring; and
a second modem coupled with the communication channel;
wherein the first and second modems are adapted to cooperatively adjust impulse noise protection and continuous noise protection without interrupting the communication service by changing the impulse noise protection in a first manner if the number of uncorrected packetized errors is greater than an uncorrected packetized error threshold and changing the impulse noise protection in a second manner that differs from the first manner if the number of corrected packetized errors is less than a corrected packetized error threshold,
wherein the first and second modems are adapted to cooperatively adjust the impulse noise protection and the continuous noise protection in a coordinated fashion to minimize redundancy,
wherein the first and second modems are adapted to selectively increase the impulse noise protection if there are uncorrected packetized errors on the communication channel during a relevant observation time that is less than a threshold time value, to selectively decrease the impulse noise protection if there are no uncorrected packetized errors on the communication channel and if a number of corrected packetized errors is less than a threshold value, and to leave the impulse noise protection unchanged if there are no uncorrected packetized errors on the communication channel and if the number of corrected packetized errors is greater than or equal to the threshold value.

9. The communication system of claim 8, wherein the first modem comprises:
a monitor system that monitors data transfer errors occurring on the communication channel; and
an analyzer system coupled with the monitor system, the analyzer system being adapted to determine whether any of the data transfer errors are packetized errors, and to determine whether any packetized errors are corrected or uncorrected.

* * * * *